United States Patent
Meier et al.

(10) Patent No.: US 12,043,131 B2
(45) Date of Patent: Jul. 23, 2024

(54) HIGH-CURRENT CONTACT MEANS AND METHOD FOR OPERATING THE HIGH-CURRENT CONTACT MEANS

(71) Applicant: TE Connectivity Germany GmbH, Bensheim (DE)

(72) Inventors: Ruediger Meier, Bensheim (DE); Waldemar Stabroth, Bensheim (DE); Volker Seipel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 399 days.

(21) Appl. No.: 17/506,782

(22) Filed: Oct. 21, 2021

(65) Prior Publication Data

US 2022/0126715 A1    Apr. 28, 2022

(30) Foreign Application Priority Data

Oct. 22, 2020   (DE) ......................... 102020127836.5

(51) Int. Cl.
*B60L 53/302* (2019.01)
*B60L 53/16* (2019.01)
(Continued)

(52) U.S. Cl.
CPC ............. *B60L 53/302* (2019.02); *B60L 53/16* (2019.02); *F25B 15/06* (2013.01); *H01R 13/005* (2013.01)

(58) Field of Classification Search
CPC ........ B60L 53/302; B60L 53/16; F25B 15/06; H01R 13/005; H01R 13/502; H01R 43/00;
(Continued)

(56) References Cited

U.S. PATENT DOCUMENTS

| 10,717,367 B1 | 7/2020 | Price et al. |
| 10,756,498 B1 | 8/2020 | Sarraf et al. |

(Continued)

FOREIGN PATENT DOCUMENTS

| CA | 2969553 A1 | 8/2016 |
| CN | 111725655 A | 9/2020 |

(Continued)

OTHER PUBLICATIONS

Office Action from the Japanese Patent Office dated Nov. 29, 2022, corresponding to Application No. 2021-171315 with English translation, 15 pages.

(Continued)

*Primary Examiner* — Michael C Zarroli
(74) *Attorney, Agent, or Firm* — Barley Snyder

(57) ABSTRACT

A high-current contact device includes a contact element and a cooling device. The cooling device has a coolant container thermally connected to the contact element, an absorber container arranged at a distance from the coolant container and the contact element, a fluid line extending between the coolant container and the absorber container, and a valve arranged in the fluid line. The coolant container has a coolant and the absorber container has an absorber material. The coolant container is fluidly connected to the absorber container in a valve open position and is fluidly separated from the absorber container in a valve closed position. The coolant changes to a gaseous phase in the coolant container to cool the contact element. The fluid line conveys the coolant in the gaseous phase from the coolant container to the absorber container, and the absorber material absorbs the coolant in the gaseous phase.

20 Claims, 5 Drawing Sheets

(51) Int. Cl.
*F25B 15/06* (2006.01)
*H01R 13/00* (2006.01)

(58) Field of Classification Search
CPC ... H01R 2201/26; H01R 13/533; Y02T 10/70; Y02T 10/7072; Y02T 90/12; Y02T 90/14; B60Y 2200/91
See application file for complete search history.

(56) References Cited

U.S. PATENT DOCUMENTS

| | | |
|---|---|---|
| 2016/0221458 A1 | 8/2016 | Lopez et al. |
| 2019/0061543 A1 | 2/2019 | Jovet et al. |
| 2019/0074144 A1* | 3/2019 | Hiller ............... F28D 15/06 |
| 2023/0124909 A1* | 4/2023 | An ..................... B60R 16/02 257/675 |

FOREIGN PATENT DOCUMENTS

| | | |
|---|---|---|
| DE | 41 26 960 A1 | 2/1993 |
| JP | H264373 A | 3/1990 |

OTHER PUBLICATIONS

Extended European Search Report, Application No. 21204278.2-1205, Dated: Mar. 21, 2022, 9 pages.
German Search Report, App. No. 10 2020 127 836.5, dated Jul. 7, 2021, 9 pages.

\* cited by examiner

HIGH-CURRENT CONTACT MEANS AND METHOD FOR OPERATING THE HIGH-CURRENT CONTACT MEANS

CROSS-REFERENCE TO RELATED APPLICATIONS

This application claims the benefit of the filing date under 35 U.S.C. § 119(a)-(d) of German Patent Application No. 102020127836.5, filed on Oct. 22, 2020.

FIELD OF THE INVENTION

The present invention relates to a contact element and, more particularly, to a high-current contact element.

BACKGROUND

There are known charging sockets for electric motor vehicles. The charging sockets each have a contact element that is connected to a thick electric cable in order to transmit the electric current between the charging socket and a control device, or traction battery. The transmitted power causes the contact element to heat up significantly. In order to avoid significant overheating of the contact element, a maximum electric power can only be transmitted via the contact element for a short period of time before the electric power to be transmitted has to be reduced in order to avoid overheating of the contact element.

SUMMARY

A high-current contact device includes a contact element and a cooling device. The cooling device has a coolant container thermally connected to the contact element, an absorber container arranged at a distance from the coolant container and the contact element, a fluid line extending between the coolant container and the absorber container, and a valve arranged in the fluid line. The coolant container has a coolant and the absorber container has an absorber material. The coolant container is fluidly connected to the absorber container in a valve open position and is fluidly separated from the absorber container in a valve closed position. The coolant changes to a gaseous phase in the coolant container to cool the contact element. The fluid line conveys the coolant in the gaseous phase from the coolant container to the absorber container, and the absorber material absorbs the coolant in the gaseous phase.

BRIEF DESCRIPTION OF THE DRAWINGS

The invention will now be described by way of example with reference to the accompanying Figures, of which.

DETAILED DESCRIPTION OF THE EMBODIMENTS

The invention will now be described in greater detail and in an exemplary manner using embodiments and with reference to the drawings. The described embodiments are only possible configurations in which, however, the individual features as described herein can be provided independently of one another or can be omitted.

In the following figures, reference is made to a coordinate system. The coordinate system in this case has an x-axis (longitudinal direction), a y-axis (transverse direction) and a z-axis (vertical direction).

Figure 1:
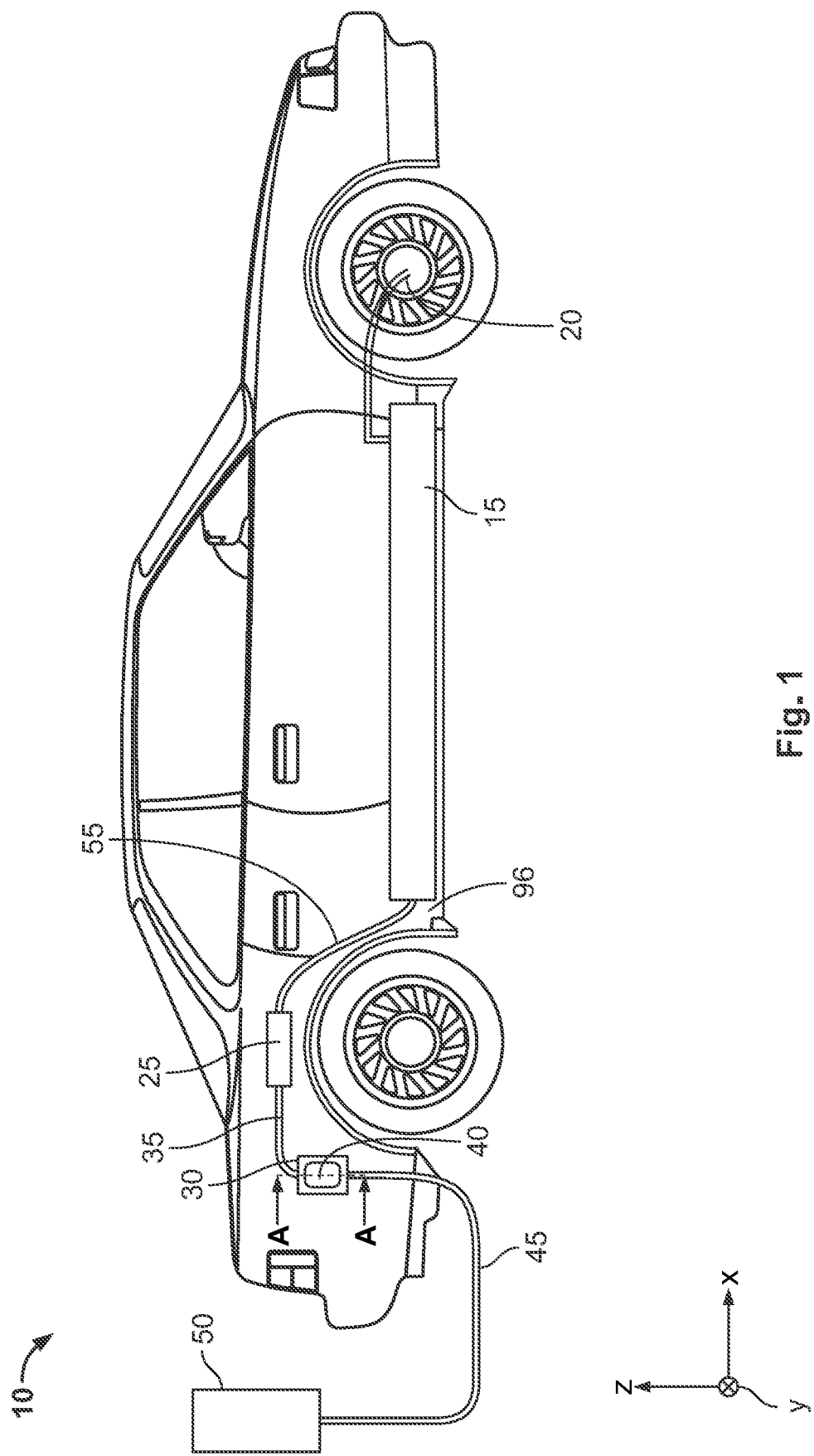
FIG. 1 is a schematic view of a motor vehicle.

A motor vehicle 10 according to an embodiment is shown in FIG. 1. In the embodiment, the motor vehicle 10 is exemplarily realized as a hybrid vehicle or as an electric vehicle. The motor vehicle 10 may be a passenger car or a truck, in particular a light-duty truck. The motor vehicle 10 has a traction battery 15, a drive motor 20, a control device 25 and a high-current contact device 30. The traction battery 15 is designed to store electrical energy and has a capacity of, for example, 30 kWh to 100 kWh. The drive motor 20 is designed to drive the motor vehicle 10 when electrical energy is provided from the traction battery 15.

The high-current contact device 30 is designed, for example, as a charging plug or charging socket and is mounted with a predefined orientation in the motor vehicle 10. The high-current contact device 30 is electrically connected to the control device 25 by a first electric lead 35. The control device 25 is electrically connected to the traction battery 15 by a second electric lead 55. The control device 25 may be realized, for example, as a charging device for charging the traction battery 15.

When the motor vehicle 10 is in a charging state, mounted on the high-current contact device 30, there is a further high-current contact device 40 that is electrically connected to a charging station 50 by a charging cable 45, as shown in FIG. 1. The charging station 50 is realized, for example, as a rapid charging station. The charging station 50 is designed to provide electric power in the range of from at least 50 kW to 500 kW, for example from at least 150 kW to 500 kW, for charging the traction battery 15 at a voltage of 700 volts to 1200 volts in an embodiment. As a result, a charging current may be approximately 40 amperes to 700 amperes. The electric power is transmitted via the charging cable 45 from the charging station 50 to the further high-current contact device 40. The electric power is transmitted to the high-current contact device 30 when the further high-current contact device 40 has been mounted on the high-current contact device 30. The electric power is charged from the high-current contact device 30 via the first electric lead 35 to the control device 25, and from the control device 25 via the second electric lead 55 to the traction battery 15. This allows particularly rapid charging of the traction battery 15.

Figure 2:
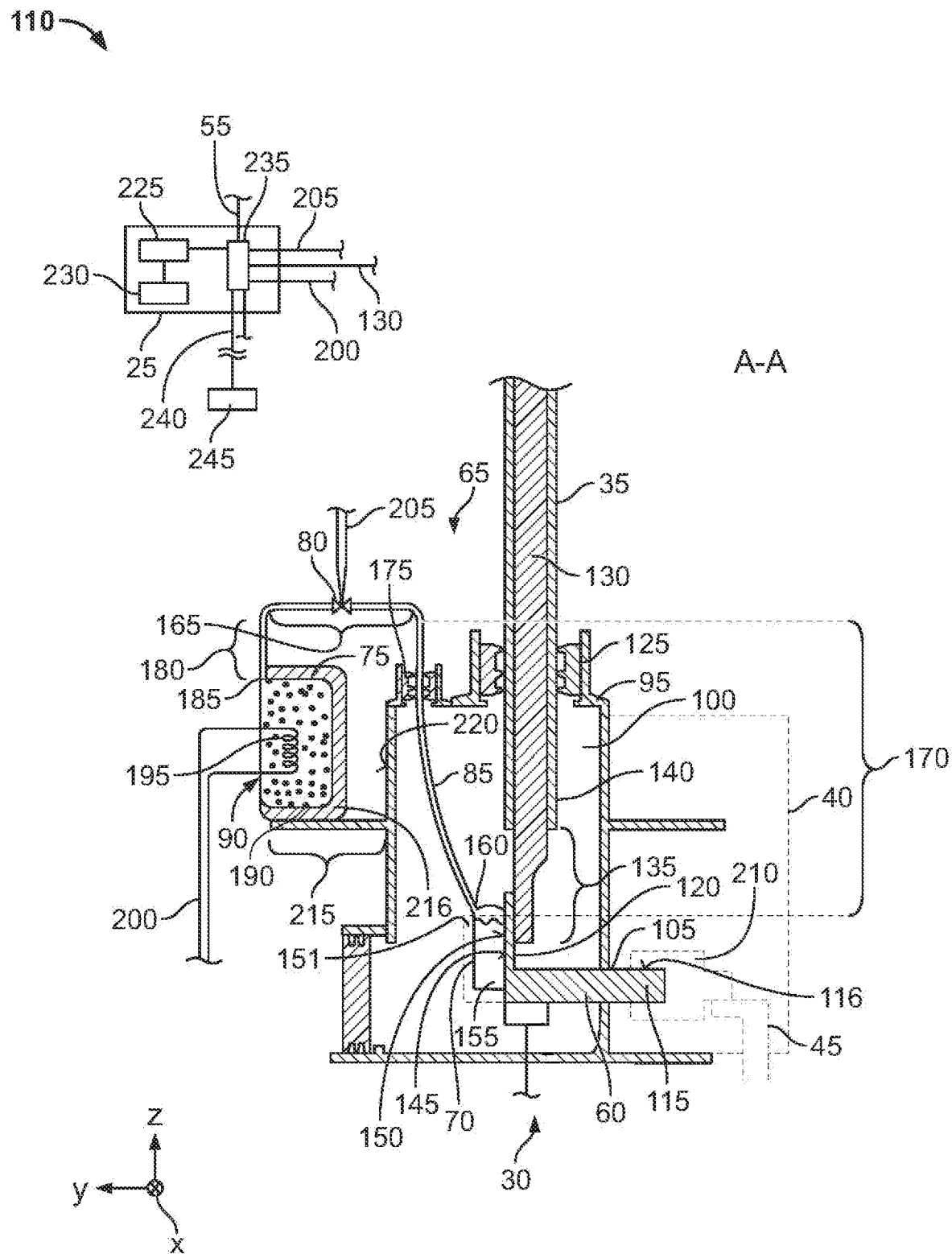
FIG. 2 is a sectional side view of a high-current contact device according to an embodiment, taken along plane A-A of FIG. 1.

FIG. 2 shows a sectional view, along a sectional plane A-A shown in FIG. 1, through the high-current contact device 30 shown in FIG. 1. The high-current contact device 30 has a contact element 60, a cooling device 65 for cooling the contact element 60, and a housing 95 for mechanically fastening the contact element 60. In an embodiment, the high-current contact device 30 has a plurality of contact elements 60, only one contact element 60 being represented, as an example, in FIG. 2. The functionality of the high-current contact device 30 shown in FIG. 2 is explained with reference to the contact element 60. The housing 95 may be mechanically connected to a body 96 of the motor vehicle 10.

The housing 95 has and at least partially delimits a housing interior 100, and has a first leadthrough 105, as shown in FIG. 2. The housing interior 100 of the high-current contact device 30, in an embodiment, is sealed off from an environment 110. The contact element 60 extends, with a contact portion 115 that in the embodiment is of a pin type, through the first leadthrough 105 of the housing 95 and protrudes, with a first sub-portion of the contact portion 115, from the housing 95. Arranged on the circumference of the contact portion 115, outside the housing 95, there is a contact surface 116 for electrical contacting.

The contact element 60 has a plate-shaped fastening portion 120 shown in FIG. 2. The fastening portion 120 is electrically, mechanically, and thermally connected to the contact portion 115, and adjoins the contact portion 115 on a side that faces away from the contact surface 116. In an embodiment, the contact portion 115 and the fastening portion 120 are made in one piece and of the same material, from an electrically conductive and thermally conductive material such as, for example, copper and/or aluminum and/or steel.

The further high-current contact device 40 (represented by a dashed line in FIG. 2) has a further contact element 210, the further contact element 210 electrically and mechanically contacting the contact surface of the contact portion 115, for example, when the further high-current contact device 40 has been mounted on the high-current contact device 30. The further contact element 210 is electrically connected to the charging station 50 via the charging cable 45.

The fastening portion 120 is arranged in the housing interior 100. Moreover, the first electric lead 35 is routed into the housing interior 100 via a second leadthrough 125 of the housing 95. The first electric lead 35 has an electric conductor 130, the electric conductor 130 having a cross-sectional area of from 50 mm$^2$ to 95 mm$^2$ in an embodiment. The electric conductor 130 may be fine-stranded or ultra-fine-stranded. In a stripped portion 135 of the first electric lead 35, an electrically insulating sheath 140 of the first electric lead 35 is removed from the electric conductor 130. The stripped portion 135 is attached, for example welded, to the fastening portion 120, on a first side 145 of the fastening portion 120.

In the embodiment, for example, one cooling device 65 is provided for each contact element 60. The cooling device 65 has a coolant container 70, an absorber container 75, an electrically switchable valve 80, a fluid line 85, and a heating device 90, as shown in FIG. 2.

The coolant container 70 is thermally coupled to the contact element 60. In the embodiment shown in FIG. 2, the coolant container 70 is thermally and mechanically connected, for example, to the fastening portion 120 on a second side 150 that is opposite the first side 145 in the y-direction. For example, the fastening portion 120 and the coolant container 70 may be connected in a materially bonded manner, for example soldered or welded. The second side 150 may be flat, for example.

The coolant container 70 could also be spaced apart from the contact element 60 and, for example, be thermally connected to the fastening portion 120 via a thermally conductive material 151, for example a thermally conductive compound. In the embodiment shown in FIG. 2, the coolant container 70 is for example additionally embedded in the thermally conductive material 151, at least in certain areas, such that the coolant container 70 is thermally connected to the fastening portion 120, and thus to the contact element 60, in a particularly efficient manner.

In an embodiment, the coolant container 70 has a capacity of at least 1.5 cm$^3$, or 2 mm$^3$, to 8 cm$^3$. When the high-current contact device 30 is in a first operating state, there is a coolant 155 present in the coolant container 70. The coolant 155 may comprise, for example, water. Also, the coolant 155 may comprise another liquid, for example alcohol and/or glycol in addition to or as an alternative to water. The coolant 155, in an embodiment is frost-proof to at least 25° C., for example to −40° C.

On a side that faces towards the second leadthrough 125, the fluid line 85 leads at a first end 160 into the coolant container 70, as shown in FIG. 2. In the embodiment, as an example, the fluid line 85 is of a U-shaped design. The fluid line 85 has an intermediate portion 165 and, for example, a first sub-portion 170 and a second sub-portion 180. The first sub-portion 170 extends substantially in the z-direction, between the first end 160 and the intermediate portion 165, along a first straight line. As shown in FIG. 2, the first sub-portion 170 in this case may be oriented obliquely relative to a direction of extent of the electric conductor 130 and/or of the z-axis. The first sub-portion 170 extends through a third leadthrough 175 of the housing 95. The intermediate portion 165 is arranged, offset in the z-direction from the coolant container 70, outside of the housing 95.

The second sub-portion 180 adjoins the intermediate portion 165 on a side that faces away from the first sub-portion 170 (in the y-direction), as shown in FIG. 2. As an example, the second sub-portion 180 runs parallel to the z-axis, as does the electric conductor 130. The second sub-portion 180 leads, at a second end 185 of the fluid line 85, into the absorber container 75.

The absorber container 75 is at least partially, and in an embodiment completely, filled with an absorber material 190. The absorber material 190 may have, for example, a crystal structure, such as a coolant-absorbing crystal structure and/or comprise zeolite and/or activated carbon and/or silicate, in particular silicate gel and/or sodium dichromate and/or lithium bromide and/or lithium hydroxide. Additionally or alternatively, the coolant 155 comprises at least water and/or alcohol and/or glycol. In an embodiment, the absorber container 75, the coolant container 70 and the fluid line 85 are under vacuum, such that a gas pressure, for example in the fluid line 85 and/or the absorber container 75 and/or the coolant container 70, is between 0.00001 MPa and 0.01 MPa in the first operating state.

The heating device 90 shown in FIG. 2 has, for example, at least one electric heating coil 195 and a supply line 200. The supply line 200 electrically connects the heating coil 195 to the control device 25. In an embodiment, the heating coil 195 is completely embedded in the absorber material 190. Embedding in this case is understood to mean that the heating coil 195 is completely enclosed by the absorber material 190. Since the electrical energy for heating the electric heating coil 195 in an electric or a hybrid vehicle is taken from the traction battery, an economical heating coil is of particular advantage.

The valve 80 is electrically connected to the control device 25 by a control line 205, as shown in FIG. 2. In the embodiment, the valve 80 is arranged, for example, in the intermediate portion 165. A different arrangement of the valve 80 is also possible, for example in the first or second sub-portion 170, 180. The valve 80 has a closed position and an open position, the valve 80 being movable between the open position and the closed position. In the closed position, the valve 80 fluidically separates the absorber container 75 from the coolant container 70. In the open position, the fluid line 85 fluidically connects the coolant container 70 to the absorber container 75.

In the embodiment shown in FIG. 2, the intermediate portion 165 is for example arranged (in the z-direction) above the first sub-portion 170 and/or the second sub-portion 180. When the high-current contact device 30 has been fitted in the motor vehicle 10, the coolant container 70 is arranged, for example, below the absorber container 75 in the z-direction. The absorber container 75 and the coolant container 70 may also be arranged at the same level. Alternatively, it would also be possible for the coolant container 70 to be arranged above the absorber container 75. Moreover, when the high-current contact device 30 has been fitted to the motor vehicle 10, the intermediate portion 165 is arranged above the coolant container 70 and/or the absorber container 75. For example, the second leadthrough 125 and the third leadthrough 175 are arranged in a common xy-plane and above the contact element 60. The U-shaped design of the fluid line 85 has the advantage that, when the valve 80 is in the open position, an unwanted overflow of the liquid coolant 155 from the coolant container 70 into the absorber container 75 is avoided.

As shown in FIG. 2, the absorber container 75 is attached to a housing web 215 of an outer housing side 220 of the housing 95 on a side of the housing 95 that faces away from the contact surface 116. A thermal insulating layer 216, which thermally insulates the absorber container 75 from the housing 95, in particular from the coolant container 70, may be provided in this case between the absorber container 75 and the housing 95.

The control device 25 comprises a control element 225, a data storage device 230 having a data connection to the control element 225, and an interface 235 connected to the control element 225, as shown in FIG. 2. A value for a first time interval, a value for a second time interval and a first threshold value S1 are stored in the data storage device 230. In addition, there may be a parameter stored in the data storage device 230. The parameter may be, for example, a tabular assignment, a mathematical algorithm, a computer program or a characteristic diagram.

As shown in FIG. 2, the interface 235 is connected to the control line 205, the supply line 200 and to the electric conductor 130 of the first electric lead 35 and to the second electric lead 55. In addition, the interface 235 may be connected to a temperature sensor 245 of the motor vehicle 10 via a first signal line 240. The temperature sensor 245 may be provided, for example as an outside-temperature sensor in the motor vehicle 10. The first signal line 240, the supply line 200 and/or the control line 205 may be part of a bus system, in particular a CAN bus.

Figure 3:
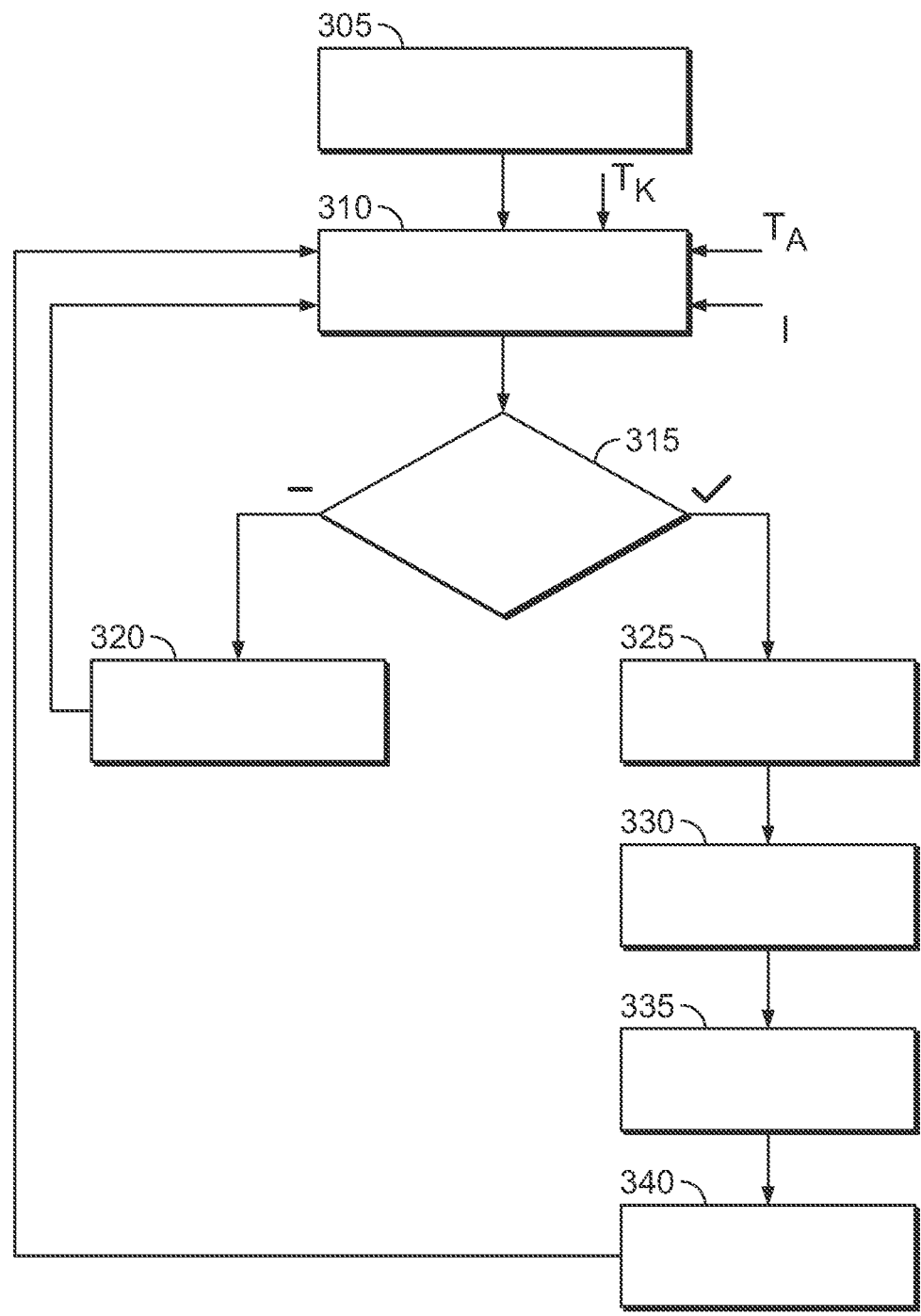
FIG. 3 is a flowchart of a method for operating the high-current contact device of FIG. 2.
Figure 4:
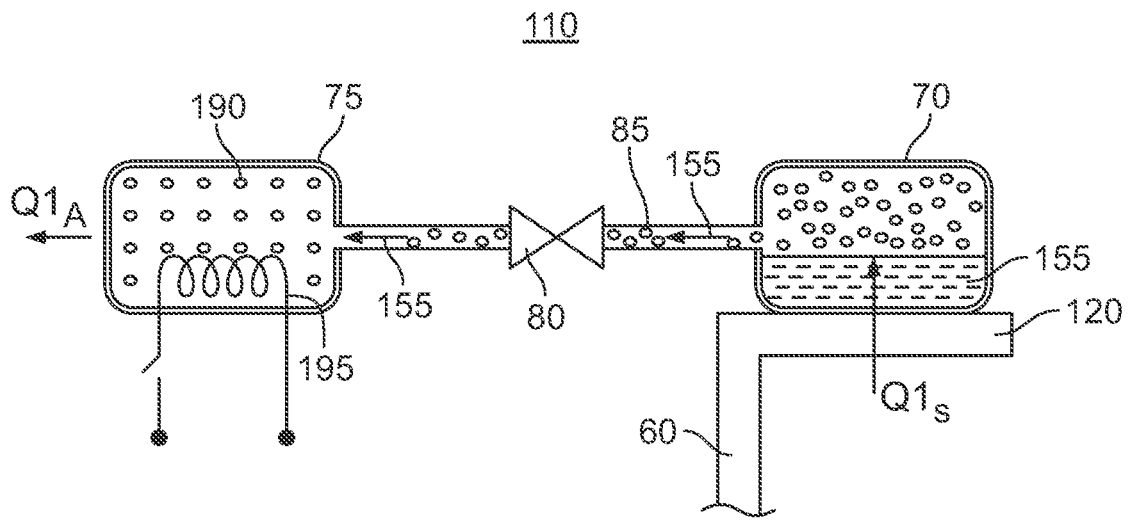
FIG. 4 is a functional diagram of the high-current contact device during a fifth method step.
Figure 5:
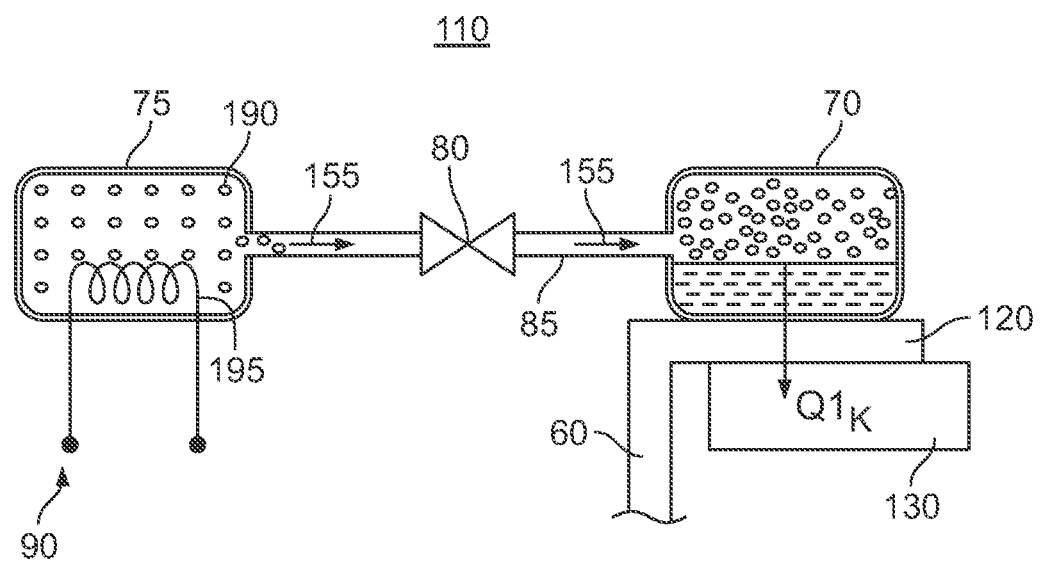
FIG. 5 is a functional diagram of the high-current contact device during a seventh method step.

FIG. 3 shows a flow diagram of a method for operating the high-current contact device 30 shown in FIGS. 1 and 2, according to a first embodiment. FIG. 4 shows a functional diagram of the high-current contact device 30 during a fifth method step 325, and FIG. 5 shows a functional diagram of the high-current contact device 30 during a seventh method step 335.

In a first method step 305, the motor vehicle 10 is disconnected from the charging station 50 and the further high-current contact device 40 is removed from the high-current contact device 30. In the first method step 305, the valve 80 is in the closed position and in the first operating state. It is of particular advantage in this case if the valve 80 is kept de-energized in the closed position.

The coolant container 70 is filled with liquid coolant 155. For example, the coolant container 70 may be filled with, for example, 2 grams of coolant 155. Further, in the first method step 305, the absorber material 190 is present in a dried state in the absorber container 75. The absorber material 190 has an ambient temperature of the high-current contact device 30. In an embodiment, for 2 grams of coolant 155, 10 grams of absorber material 190 are provided in a dried state in the absorber container 75. Further, in the first method step 305, the heating device 90 is deactivated and is de-energized, for example, by the control element 225.

In a second method step 310 shown in FIG. 3, the further high-current contact device 40 is plugged onto the high-current contact device 30 and a charging operation is started. The charging operation is monitored and performed, for example, by the control device 25. The control element 225 in this case may connect the first electric lead 35 to the second electric lead 55.

The control element 225 determines an electric current I, transmitted via the contact element 60, for charging the traction battery 15. During charging, the contact element 60 heats up due to a first ohmic contact resistance between the contact surface 116 and the further contact element 210, a second ohmic contact resistance between the electric conductor 130 and the fastening portion 120, and an internal ohmic resistance of the contact element 60.

During the second method step 310, the first temperature sensor 245 determines, for example, an outside temperature TA of the motor vehicle 10. Via the first signal line 240, the first temperature sensor 245 provides a first temperature signal, corresponding to the outside temperature TA, to the interface 235, which transfers the first temperature signal to the control element 225. The control element 225 can calculate a contact-element temperature TK of the contact element 60 on the basis of the predefined parameter, the determined outside temperature TA and the determined electric current I flowing through the contact element 60.

In a third method step 315 following the second method step 310, as shown in FIG. 3, the control element 225 compares the determined contact-element temperature TK, as an operating parameter of the contact element 60, with the predefined first threshold value S1. The first threshold value S1 may be, for example, 50° C. to 70° C. The control element 225 continues with a fourth method step 320 if the operating parameter, in the exemplary embodiment the contact-element temperature TK, is less than the predefined first threshold value S1. The control element 225 continues with a fifth method step 325 if the contact-element temperature TK, as an operating parameter, is greater than the predefined first threshold value S1.

The operating parameter may be determined, for example, on the basis of an ambient temperature of the high-current contact element 60 and/or of an electric current transmitted via the contact element 60. The operating parameter may also be the electric current transmitted via the contact element 60. This avoids unnecessary activation of the cooling device 65, for example when a low electric current (for example less than 50 amperes) is transmitted via the contact element 60 or the contact element 60 only heats up slightly due to a low outside temperature. This means that the cooling device 65 is still available if, for example, the charging station 50 is changed in order to transmit a high current via the contact element 60. Furthermore, the service life of the cooling device 65 is extended and an unnecessary load on the traction battery 15 is avoided.

In the fourth method step 320 shown in FIG. 3, the control element 225 continues to hold the valve 80 in the closed position, for example, by a closing signal. After the fourth method step 320, the second method step 310 is repeated.

In the fifth method step 325, shown in FIGS. 3 and 4, the control element 225 controls the valve 80 by an opening signal, which is transmitted to the valve 80 via the interface 235 and the control line 205, for example, in such a way that the valve 80 is moved from the closed position to the open position for the first time interval. In the open position, the valve 80 fluidically connects the coolant container 70 to the absorber container 75.

As a result of the opening of the valve 80, the liquid coolant 155 changes from the liquid phase to a gaseous phase. To effect the phase change, the liquid coolant 155 absorbs a first heat QS from the contact element 60 and thereby cools the contact element 60 (FIGS. 4 and 5 show a first heat flow Q1S of the first heat Q1S from the contact element 60 to the coolant 155). Cooling of the contact element 60 ensures that the heating of the contact element 60 ensures a contact-element temperature TK of below, for example, 90° C., although the high electric current I of between 40 amperes and 700 amperes, in particular between 200 amperes and 500 amperes, is transmitted via the contact element 60. Moreover, as a result of the cooling of the contact element 60, the stripped portion 135 of the first electric lead 35 is also cooled.

Due to the cooling, there is no need to reduce the electric power for charging the traction battery 15. The cooling of the contact element 60 thus ensures that the traction battery 15 can be charged particularly quickly by the charging station 50 and that a charging operation for charging the traction battery 15 is particularly short. Moreover, the cross-sectional area of the electric conductor 130 can be kept particularly small. Thus, for example, the cross-sectional area can be reduced from the size mentioned above (50 mm² to 95 mm²) to 45 mm² to 75 mm². Furthermore, the cross-sectional area of the electric conductor 130 can be optimized in dependence on a duration of the current transmission via the contact element.

The gaseous coolant 155 flows from the coolant container 70 into the fluid line 85 and via the valve 80 towards the absorber container 75. In the absorber container 75, the absorber material 190 absorbs the gaseous coolant 155. In the process, the absorber material 190 heats up. The heat QA produced in the absorption of the gaseous coolant 155 is absorbed by the absorber container 75 and emitted into the environment 110 of the high-current contact device 30 (FIG. 4 shows a second heat flow Q1A of the second heat QA). The emitted second heat QA may in particular be emitted into an interior of the motor vehicle 10. The thermal insulation of the absorber container 75 from the housing 95 by the insulating layer 216 prevents the housing 95 from being damaged by the second heat QA. Moreover, the absorber container 75 is prevented from heating the coolant container 70 and the coolant 155 contained therein.

This design has the advantage that it is possible to regenerate the absorber material 190 and the coolant 155, and following heating of the coolant 155, the absorber material 190 is again able to receive gaseous coolant 155. Consequently, following regeneration of the absorber material 190, the contact element 60 can be cooled multiple times by the cooling device.

In a sixth method step 330, the predefined first time interval, for example 30 to 180 minutes, is waited. Within the first time interval, the traction battery 15 is charged to such an extent that the current I transmitted via the contact element 60 for charging the traction battery 15 is reduced, thereby reducing the heating of the contact element 60. In an embodiment, within 30 minutes after opening of the valve 80, the charging operation of the traction battery 15 is completed to such an extent that a driver of the motor vehicle 10 may prematurely terminate the charging operation. Alternatively, the charging operation may be progressed to such an extent that the traction battery 15 is substantially fully charged. Within the first time interval and during charging, the cooling device 65 cools the contact element 60. The cooling process for cooling the contact element 60 ends when the coolant 155 has been completely changed from the liquid phase to the gas phase. Due to the phase conversion, a particularly large amount of heat can be absorbed from the contact element 60 by the coolant 155, and thus the contact element 60 can be cooled particularly effectively.

In addition, the first time interval is such that there is sufficient time for the contact element 60 and the electric conductor 130 to cool down, following charging, substantially to the ambient temperature of the high-current contact device 30.

In a seventh method step 335 following the sixth method step 330 (i.e. following the waiting of the first time interval), the control element 225 activates the heating device 90 via the interface 235 (see FIG. 5). Upon activation of the heating device 90, the electric heating coil 195 is supplied with electrical energy from the traction battery 15. The heating coil 195 heats the absorber material 190, for example to a temperature of between 150° C. and 300° C. This causes the coolant 155 absorbed in the absorber material 190 to be vaporized and the absorber material 190 to be dried. The insulating layer 216 protects the housing 95 from thermal damage.

The vaporised hot coolant 155 flows via the fluid line 85 and the open valve 80 into the coolant container 70, as shown in FIG. 5. Due to the fact that it is thermally coupled to the contact element 60 and via the contact element 60 to the electric conductor 130, the coolant container 70 acts as a heat sink with respect to the coolant container 70. The gaseous coolant 155 condenses in the coolant container 70 and, following condensation, is present there again as liquid coolant 155. The heat dissipation Q1K from the coolant 155 that is necessary for condensation is dissipated via the contact element 60 and the electric conductor 130 and emitted to the environment 110. The electric conductor 130 has a particularly high heat capacity, owing to its large cross-section.

Following the elapse of a second time interval, in which the heating device 90 is activated by the control element 225, for example 15 minutes to 30 minutes, the control element 225 deactivates the heating device 90 and controls the valve 80 by a closing signal in such a way that, in the eighth method step 340, the valve 80 is moved from the open position to the closed position.

After the eighth method step 340 shown in FIG. 3, the method is continued with the second method step 310. The seventh and the eighth method step 335, 340 may be repeated at regular regeneration time intervals following the opening of the valve 80, in order to regenerate the absorber material 195 if there is a slight leakage of the valve 80. The regeneration time interval may be, for example, 24 h to 1 week. This ensures an optimal cooling capacity of the cooling means 65 if necessary.

Figure 6:
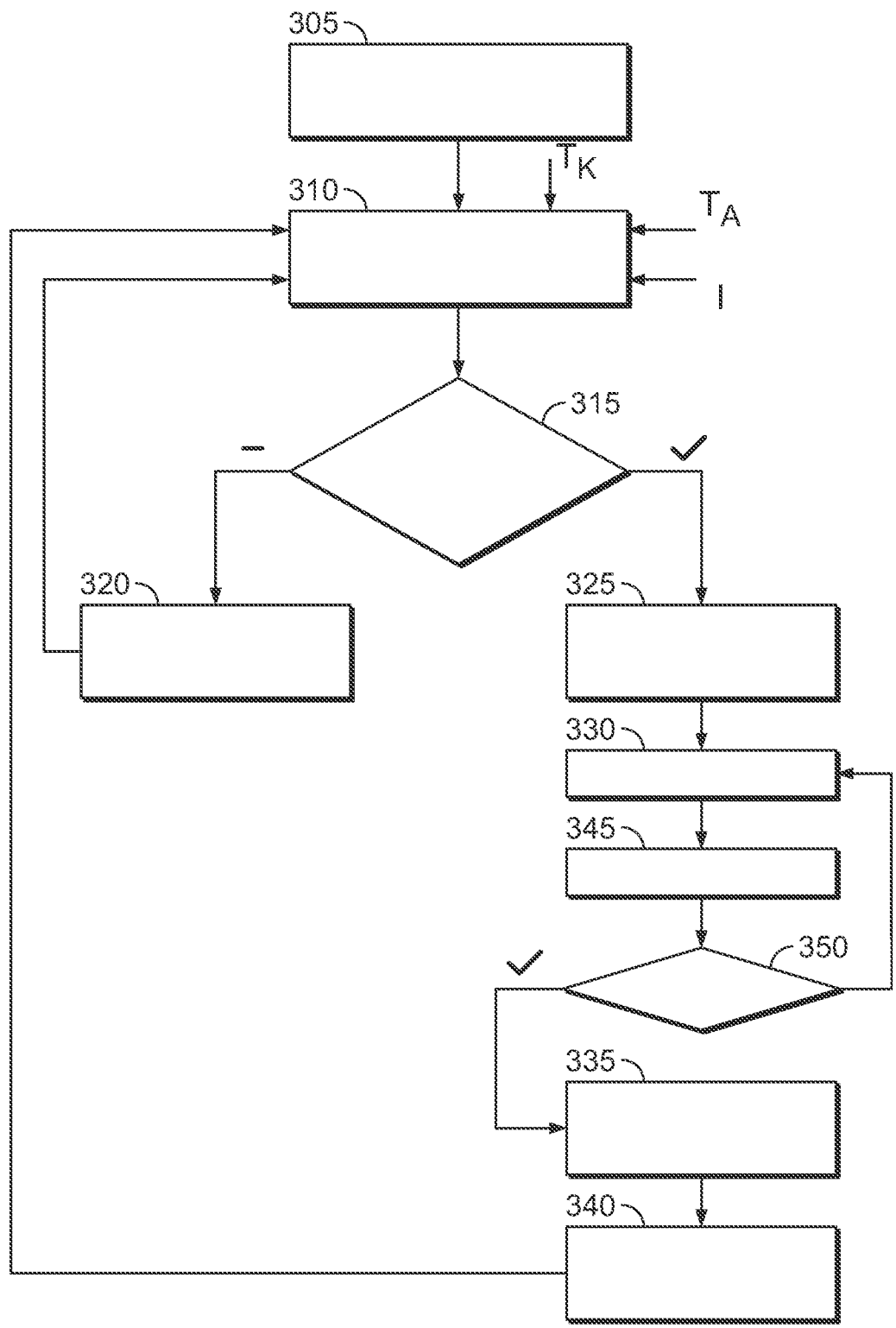
FIG. 6 is a flowchart of a method according to another embodiment for operating the high-current contact device.

FIG. 6 shows a flow diagram of a method according to a second embodiment, for operating the high-current contact device 30 shown in FIGS. 1 and 2 according to a second embodiment. The method is substantially identical to the method explained in FIG. 3. In the following, only the differences between the method described in FIG. 6 and the method described in FIG. 3 will be discussed.

As shown in FIG. 6, a ninth method step 345 and a tenth method step 350 following the ninth method step 345 are performed between the sixth method step 330 and the seventh method step 335. The ninth method step 345 follows the sixth method step 330 and is substantially identical to the second method step 310. In the ninth method step 345, the operating parameter is determined again, such that the operating parameter is updated relative to the second method step 310. In this case, as in the second method step 310, the outside temperature TA and the electric current I transmitted via the contact element 60 are determined again, and the contact-element temperature TK is determined again on the basis of the outside temperature TA, the transmitted electric current I and the parameter, for example as an operating parameter.

In a tenth method step 350 following the ninth method step 345, shown in FIG. 6, the updated operating parameter, for example the updated contact-element temperature TK determined in the ninth method step 345, is compared with a predefined second threshold value S2 stored in the data storage device 230. If the determined contact-element temperature TK is below the second threshold value S2, the process continues with the seventh method step 335. If the determined contact-element temperature TK exceeds the second threshold value S2, the process continues with the sixth method step 330, and the first time interval is waited again. Advantageously, in the embodiment the first time interval is shortened compared to FIG. 3. Thus, the first time interval may be 15 minutes to 30 minutes. When the first time interval is waited again, the charging operation for charging the traction battery 15 may be completed, and/or there is sufficient time for the contact element 60 and the electric conductor 130 to cool down to the ambient temperature.

The second threshold value S2, in an embodiment, is lower than the first threshold value S1. In the embodiment, the second threshold value S2 may be, for example, 30° C. to 50° C.

As an alternative to the determination of the operating parameter of the contact element 60 described above, for example the current I transmitted via the contact element 60 may also be used as an operating parameter instead of the contact-element temperature TK. For example, the first threshold value S1 has a value of 50 amperes to 200 amperes. The second threshold value S2 is selected to be smaller than the first threshold value S1 and may be, for example, 30 amperes to 100 amperes.

The design of the high-current contact device 30 described above has the advantage that there is no need for further cooling devices. The cooling device 65 is integrated into the high-current contact device 30, such that, in particular, there is no need for large heat sinks for passive cooling, fans for active cooling or similar. In addition, owing to the cooling of the contact element 60 and of the electric conductor 130 connected to the contact element 60, the cross-section of the electric conductor 130 can be kept particularly small. This results in a large saving in weight for connection of the electric conductor 130 to the control device 25 and the traction battery 15. Moreover, due to the smaller cross-section, the first electric lead 35 can be laid in particularly tight radii, such that the installation space required for realizing the high-current vehicle electrical system is reduced.

If the high-current contact device 30 has a plurality of contact elements 60, the cooling device 65 may be provided for each of the contact elements 60. Alternatively, an absorber container 75 may be fluidically connected, for example via a plurality of fluid lines 85, to a plurality of coolant containers 70, each of which is arranged on a contact element 60. This design has the advantage that each of the contact elements 60 of the high-current contact device 30 is cooled.

Furthermore, the integrated cooling device 65 also allows the installation space requirement and the mass of the high-current contact device 30 to be reduced. Moreover, a mass of the high-current contact device 30 can be reduced.

What is claimed is:

1. A high-current contact device, comprising:
   a contact element; and
   a cooling device having a coolant container thermally connected to the contact element, an absorber container arranged at a distance from the coolant container and the contact element, a fluid line extending between the coolant container and the absorber container, and a valve arranged in the fluid line, the coolant container is at least partially filled with a coolant in a liquid phase and the absorber container is at least partially filled with an absorber material, the valve is adjustable between an open position and a closed position, the coolant container is fluidly connected to the absorber container in the open position and is fluidly separated from the absorber container in the closed position, the coolant changes to a gaseous phase in the coolant container with the valve in the open position to cool the contact element, the fluid line conveys the coolant in the gaseous phase from the coolant container to the absorber container, the absorber material absorbs the coolant in the gaseous phase.

2. The high-current contact device of claim 1, further comprising a heating device arranged in the absorber container.

3. The high-current contact device of claim 2, wherein the heating device heats the absorber material to a predefined temperature to remove the coolant from the absorber material.

4. The high-current contact device of claim 3, wherein the heating device has an electric heating coil and is at least partially embedded in the absorber material.

5. The high-current contact device of claim 1, wherein the fluid line has a first sub-portion leading into the coolant container, a second sub-portion leading into the absorber container, and an intermediate portion fluidly connecting the first sub-portion and the second sub-portion.

6. The high-current contact device of claim 5, wherein the intermediate portion is arranged on a top side of the coolant container and/or the absorber container.

7. The high-current contact device of claim 1, wherein the contact element has a contact portion electrically contacting a further high-current contact device and a fastening portion electrically and mechanically connected to the contact portion.

8. The high-current contact device of claim 7, further comprising a first electric lead having an electric conductor connected to a first side of the fastening portion.

9. The high-current contact device of claim 8, wherein the coolant container is thermally connected to a second side of the fastening portion that faces away from the first side.

10. The high-current contact device of claim 1, further comprising a housing at least partially delimiting a housing interior, the coolant container is arranged in the housing interior and the absorber container is arranged on an outer side of the housing.

11. The high-current contact device of claim 1, wherein the absorber material has a crystal structure and/or the absorber material includes at least one of zeolite, activated carbon, silicate, sodium dichromate, lithium bromide, and lithium hydroxide.

12. The high-current contact device of claim 1, wherein the coolant includes water and at least one of alcohol and glycol.

13. A method for operating a high-current contact device, comprising:
providing the high-current contact device including a contact element and a cooling device, the cooling device having a coolant container thermally connected to the contact element, an absorber container arranged at a distance from the coolant container and the contact element, a fluid line extending between the coolant container and the absorber container, and a valve arranged in the fluid line, the coolant container is at least partially filled with a liquid coolant and the absorber container is at least partially filled with an absorber material, the valve is adjustable between an open position and a closed position;
moving the valve from the closed position to the open position;
changing the coolant from a liquid phase to a gaseous phase in the coolant container with the valve in the open position;
cooling the contact element with the coolant in the gaseous phase, the coolant in the gaseous phase flowing along the fluid line into the absorber container; and
absorbing the coolant in the gaseous phase with the absorber material.

14. The method of claim 13, further comprising determining an operating parameter of the contact element, the valve is moved from the closed position to the open position if the operating parameter exceeds a predefined threshold value, the operating parameter is determined based on ambient temperature of the high-current contact device and/or of an electric current transmitted via the contact element.

15. The method of claim 13, wherein the valve remains in the open position for a predefined first time interval of 30 to 180 minutes.

16. The method of claim 13, wherein, after transmission of current via the contact element has ended, a heating device arranged in the absorber container is activated after the contact element has cooled below a predefined second threshold value.

17. The method of claim 16, wherein the absorber material is heated to a predefined temperature and the coolant in the absorber material is changed to the gaseous phase, the coolant flows from the absorber container to the coolant container via the fluid line and condenses in the coolant container.

18. The method of claim 17, wherein the heating device heats the absorber material to a temperature of 150° C. to 300° C. to vaporize the coolant.

19. The method of claim 17, wherein the valve is switched from the open position to the closed position following deactivation of the heating device.

20. The method of claim 17, wherein the valve is moved in a periodically iterative manner from the closed position to the open position in a regular regeneration time interval and the heating device is activated substantially simultaneously to heat the absorber material to the predefined temperature.

* * * * *